(12) United States Patent
Sakai et al.

(10) Patent No.: US 7,441,938 B2
(45) Date of Patent: Oct. 28, 2008

(54) PLANAR LIGHT SOURCE DEVICE

(75) Inventors: Seiji Sakai, Tokyo (JP); Takuya Sakamoto, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/623,909

(22) Filed: Jan. 17, 2007

(65) Prior Publication Data

US 2007/0165421 A1      Jul. 19, 2007

(30) Foreign Application Priority Data

Jan. 18, 2006  (JP) .......................... P2006-009711

(51) Int. Cl.
  *F21V 7/04*   (2006.01)
(52) U.S. Cl. ................... 362/634; 362/612; 362/632
(58) Field of Classification Search ............. 362/800, 362/600, 606–608, 611–613, 632–634; 349/61–71, 349/58–60
See application file for complete search history.

(56) References Cited

U.S. PATENT DOCUMENTS 5,882,949 A * 3/1999 Okazaki ................. 438/26

2005/0141244 A1 * 6/2005 Hamada et al. ............ 362/612
2005/0254258 A1 * 11/2005 Lee ........................... 362/612

FOREIGN PATENT DOCUMENTS

| JP | 2001-14922 | 1/2001 |
| JP | 2002-229022 | 8/2002 |
| JP | 2003-76287 | 3/2003 |

OTHER PUBLICATIONS

U.S. Appl. No. 11/623,909, filed Jan. 17, 2007, Sakai et al.
U.S. Appl. No. 11/623,961, filed Jan. 17, 2007, Sakai.
U.S. Appl. No. 11/624,488, filed Jan. 18, 2007, Sakamoto et al.

* cited by examiner

*Primary Examiner*—Jong-Suk (James) Lee
*Assistant Examiner*—Julie A. Shallenberger
(74) *Attorney, Agent, or Firm*—Oblon, Spivak, McClelland, Maier & Neustadt, P.C.

(57) ABSTRACT

A planar light source device includes: a plurality of point light sources, each of which emits a light; a light guide plate that includes a first surface, and a second surface perpendicular to the first surface, and that is configured to guide the emitted lights incident from the first surface to be emitted from the second surface; a bottom case including a side portion substantially parallel to the first surface; a light source substrate that includes the plurality of point light sources arranged thereon at a predetermined interval, and that is arranged at a side of the first surface; a frame that sandwiches the light source substrate and the side portion of the bottom case and holds the second surface and that includes a plurality of gaps at positions facing the point light source.

12 Claims, 4 Drawing Sheets

PLANAR LIGHT SOURCE DEVICE

CROSS-REFERENCE TO RELATED APPLICATIONS

This application is based upon and claims the benefit of priority from Japanese Patent Application No. 2006-009711, filed Jan. 18, 2006, the entire contents of which are incorporated herein by reference.

BACKGROUND OF THE INVENTION

1. Field of the Invention

The present invention relates to a planar light source device using point light sources and in particular to a planar light source device applicable to a display device using a liquid crystal.

2. Description of the Related Art

A liquid crystal display device, a signboard or a guide lamp is a non-luminous display device rather than a luminous display device including a luminous display part. Such a non-luminous display device requires a planar light source device such as a backlight on the rear surface of a display part. Planar light source devices come in side light type (edge light type) or direct backlight type. The side light type planar light source device has a light source arranged on the side surface of a housing case while the direct type planar light source device has a light source arranged on the rear surface of a housing case opposed to a liquid crystal display part. Some of the side light type planar light source devices use a light guide plate for guiding light from a light source in a desired direction. A planar light source device using a light guide plate reflects light emitted from a side light part composed of a linear light source such as a CCFL (Cold Cathode Fluorescent Lamp) or a point light source such as an LED (Light Emitting Diode) inside a light guide plate and causes the light to be diffused in a dot pattern provided inside the light guide plate thus emitting the light in a planar shape.

In general, for a planar light source device using a point light source such as an LED as a light-emitting element, in order to enhance the luminance of a display screen, the number of light-emitting elements is increased to raise the density of elements or increase the current value to be supplied to each point light source. In any way, heat generated by each point light source that accompanies lighting causes the periphery of the point light source to be excessively hot. This lowers the luminous flux of the point light source thus shortening the service life of the point light source and reducing reliability. A planar light source device has been proposed including heat dissipation means on a substrate including point light sources (for example, refer to JP-A-2002-229022 or JP-A-2003-76287). In such a planar light source device, the heat dissipation is improved so that it is possible to increase the number of elements of point light sources and the current supplied to each point light source.

In case a point light source is used as a light source in a related art planar light source device, a plurality of light-emitting diodes are arranged in a row to form a light source. This results in unevenness in luminance between the proximity to a point light source and the proximity to the area between adjacent point light sources. Thus, in other related art planar light source devices, pits and projections are provided on the light incident surface of a light guide plate and the light-emitting diodes are fitted into the pits and reflecting members are provided on the projections on the light incident surface of the light guide plate. With this configuration, unevenness in luminance of the light emitted from an opening has been reduced (for example, refer to JP-2001-14922).

SUMMARY OF THE INVENTION

The planar light source device described in JP-A-2002-229022 or JP-A-2003-76287 is accompanied by a problem that the frame or thickness of the planar light source device becomes large due to its structure or the number of necessary parts is increased. Further, the reliability is reduced because a viscous material fixing a light source substrate to a bottom case is gradually peeled off with time, or point light sources are dislocated from the dot pattern of a light guide plate from desired positions thus resulting in uneven luminance. According to the planar light source device described in JP-A-2001-14922, point light sources are arranged discretely so that the luminance in proximity to a point light source is slightly higher than that in proximity to the area between the point light sources adjacent each other. The difference in luminance results in degradation of display quality in a display device using such a planar light source device.

The present invention has been made in view of the above circumstances and provides a planar light source device using point light sources. According to an aspect of the invention, the planar light source device having a reliable excellent heat dissipating structure and capable of reducing the unevenness in luminance between the proximity to a point light source and the proximity to the area between point light sources adjacent each other.

According to an aspect of the invention, there is provided a planar light source device including: a plurality of point light sources, each of which emits a light; a light guide plate that includes a first surface, and a second surface perpendicular to the first surface, and that is configured to guide the emitted lights incident from the first surface to be emitted from the second surface; a bottom case including a side portion substantially parallel to the first surface; a light source substrate that includes the plurality of point light sources arranged thereon at a predetermined interval, and that is arranged at a side of the first surface; a frame that sandwiches/clamps the light source substrate and the side portion of the bottom case and holds the second surface and that includes a plurality of gaps at positions facing the point light source.

According to the above configuration, it may be possible to provide a planar light source device capable of efficiently dissipating heat from a point light source without causing dislocation of a point light source and the dot pattern of a light guide plate and reducing unevenness in luminance between the proximity to a point light source and the proximity to the area between adjacent point light sources.

BRIEF DESCRIPTION OF THE DRAWINGS

Embodiments of the present invention will be described in detail based on the following figures, wherein.

DETAILED DESCRIPTION OF THE INVENTION

Embodiment 1

Figure 1:
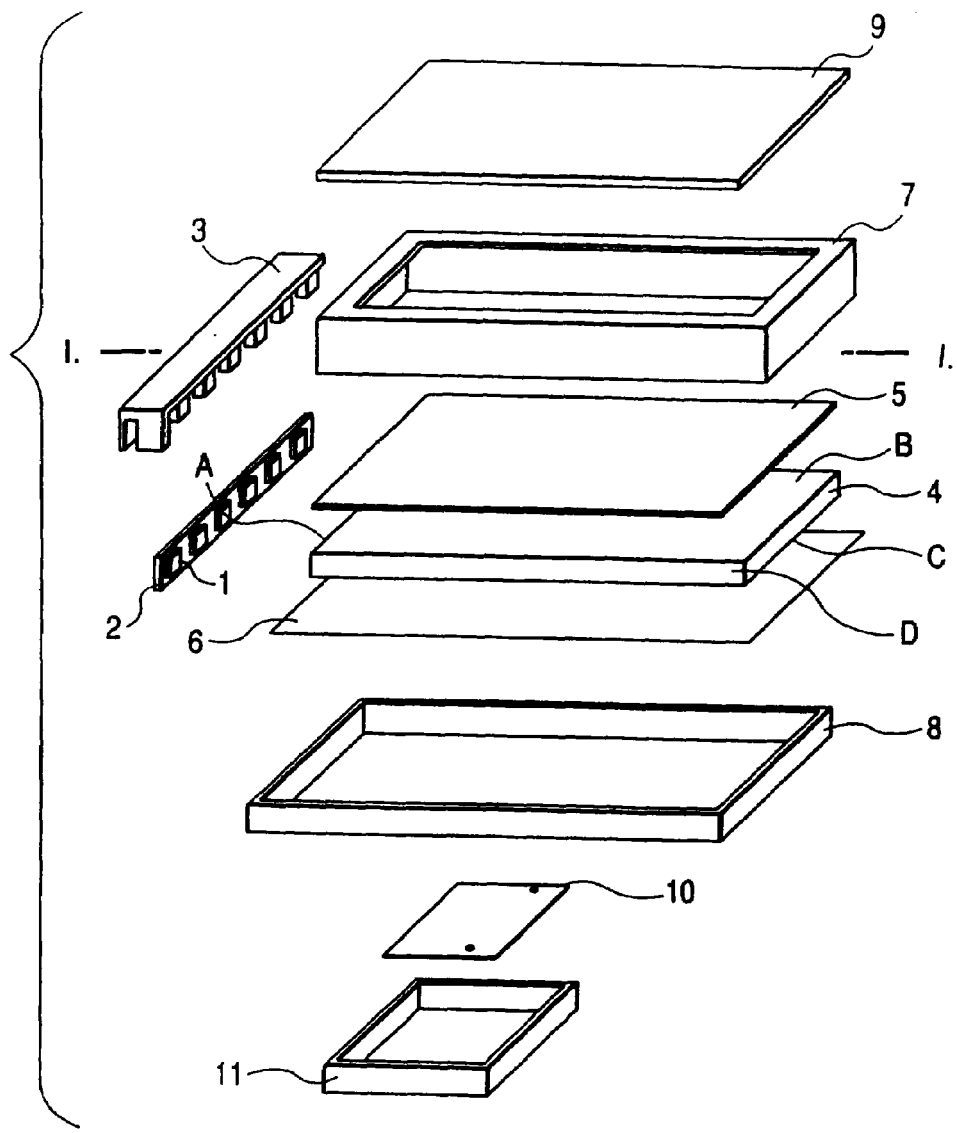
FIG. 1 is an exploded perspective view of a planar light source device according to Embodiment 1.
Figure 2:
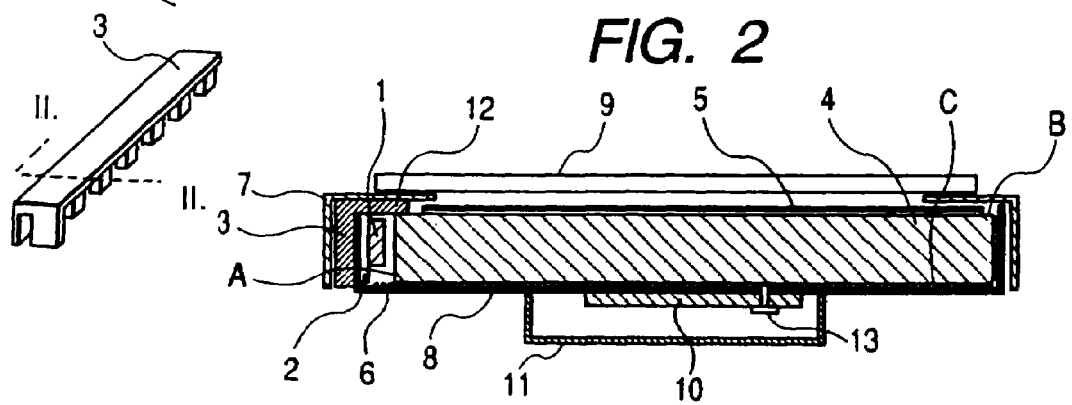
FIG. 2 is a cross-sectional view of a point light source part shown in FIG. 1 along the II-II direction.
Figure 3:
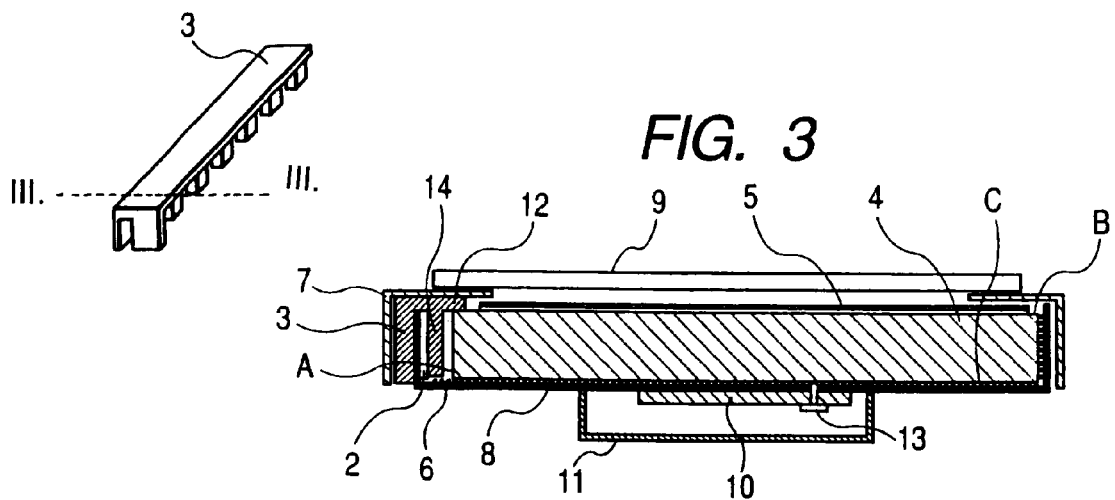
FIG. 3 is a cross-sectional view of area between adjacent point light sources shown in FIG. 1 along the III-III direction.
Figure 4:
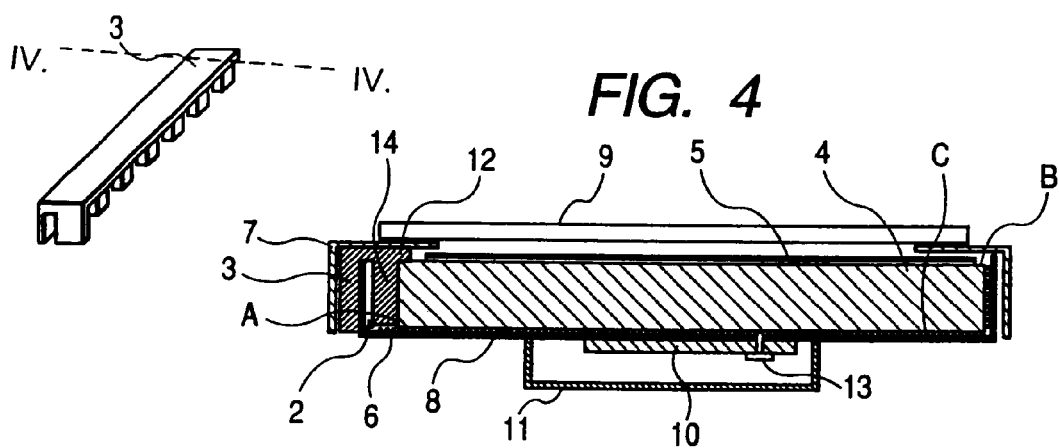
FIG. 4 is a cross-sectional view of the proximity to both ends of a light source substrate shown in FIG. 1 along the IV-IV direction.
Figure 5:
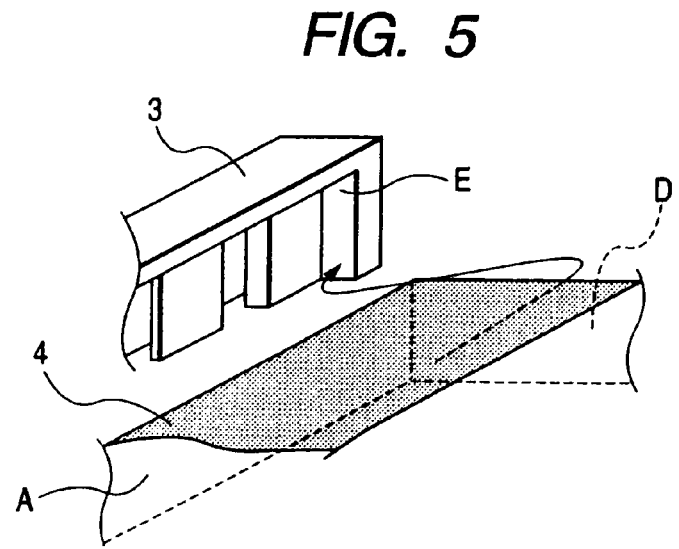
FIG. 5 is an enlarged perspective view of a planar light source device according to Embodiment 1.

Embodiment 1 of the invention will be described referring to FIGS. 1 to 5. FIG. 1 is an exploded perspective view illustrating a planar light source device according to Embodiment 1. FIGS. 2 to 4 are cross-sectional views of a display device along the X-X direction assembled and completed from parts shown in the exploded view of FIG. 1. FIG. 5 is an enlarged perspective view of the display device.

Referring to FIG. 1, a plurality of point light sources 1 such as LEDs are arranged almost in a row while being installed on a light source substrate 2. The light source substrate 2 is supported by a resin frame 3 (the supporting method will be described later). The point light sources 1 are arranged in close proximity to one side of a light guide plate 4. A side A to which light from a light source is incident is hereinafter referred to as a light incident surface. Light from point light sources that enter the light incident surface A is emitted from the light outgoing surface B of the light guide plate 4 (surface B in the upper area of the light guide plate 4 shown in FIG. 1). The light outgoing surface B is perpendicular to the light incident surface A. On the light outgoing surface B of the light guide plate 4 are provided optical sheets 5. On surface C opposite to the light outgoing surface B (the surface C in the lower area of the light guide plate 4 shown in FIG. 1) is provided a reflection sheet 6. In the planar light source device shown in FIG. 1, the point light sources 1, the light source substrate 2, the resin frame 3, the light guide plate 4, the optical sheets 5 and the reflection sheet 6 are sandwiched with a top case 7 and a bottom case 8. The top case 7 has an opening. The opening faces the light outgoing surface B of the light guide plate. Thus, the planar light source device emits planar light from the opening. The size of the opening is designed to be smaller than the outer circumference of the light guide plate 4.

A point light source used in this embodiment may be a point light source such as an LED and a LD (Laser Diode) as well as a linear light source such as a cold cathode fluorescent lamp. In particular the LED used may be a semiconductor light-emitting element that emits monochromatic light such as blue color or a pseudo-white LED including a phosphor that absorbs part of blue light from a semiconductor light-emitting element and emits yellow light. The LED may include RD, GREEN and BLUE elements and emit white light as synthetic light including three monochromatic light beams. In this embodiment, a pseudo-white LED is used as a point light source.

The plurality of point light sources 1 are mounted on the light source substrate 2 with predetermined spacing as shown in FIG. 1. While point light sources and a light source substrate are provided on one side of the light guide plate 4 alone in FIG. 1, the invention is not limited thereto but the point light sources 1 and light source substrates 2 may be provided on two or more sides of the light guide plate. The light source substrate 2 has a circuit pattern for holding the point light sources 1 and supplying power to the point light sources 1. By using a metal core substrate as a light source substrate 2, it may be possible to efficiently transmit heat from the point light sources 1 mounted on the substrate to its periphery. By mounting the point light sources 1 while using a thin FPC (Flexible Printing Circuit) onto the light source substrate 2, it may be possible to more efficiently transmit heat from the point light sources 1 to the periphery of the substrate. Further, in case an FPC is used as a light source substrate 2, the external size of a planar light source device can be reduced.

Next, the light guide plate 4 is composed of a transparent acrylic resin, a polycarbonate resin, or glass. On the surface C of the light guide plate 4 is formed a light dispersion part (not shown) for disordering the light propagation direction and guiding light to a light outgoing surface B. The light dispersion part serves as means for reflecting light toward the interior of the light guide plate 4. To be more specific, available approaches include a method for printing a dot pattern on the surface C, a method for making rough the surface C, and a method for forming pits and projections such as microscopic spheres or prisms for changing the light propagating direction on the surface C. Emboss processing (formation of pits and projections) may be applied to the light outgoing surface B to provide asperities on the surface instead of providing a light dispersion part on the surface C of the light guide plate 4. This approach is equally advantageous. That is, when pits and projections are provided on the light outgoing surface B of the light guide plate 4, light emitted from the light outgoing surface B has list light propagating direction disordered by the pits and projections on the light outgoing surface B. As a result, part of light emitted from the light outgoing surface B is reflected toward the interior of the light guide plate and the remaining light is emitted out of the light guide plate from the light outgoing surface B. Thus, it may be possible to apply emboss processing to the light outgoing surface B of the light guide plate alone without providing reflection means on a separate surface. The emboss processing applied to the light outgoing surface B has the same working effect as dot pattern printing on the surface C for example and serves as reflection means.

On the light guide plate 4 are arranged optical sheets 5 including multiple optical sheets. To be more specific, the optical sheets 5 have a structure where a lens sheet is clipped by diffusion sheets. To enhance the luminance of a planar light source device, multiple lens sheets may be used in combination considering the direction of prisms formed on a lens sheet. Two or more diffusion sheets may be used in consideration of light diffusion properties. Depending on the light distribution characteristic of a lens sheet, a single lens sheet may be used for the optical sheets 5, or a lens sheet may be omitted. As optical sheets, a combination of a protection sheet, a lens sheet or a polarized light reflection sheet may be used. The use of the optical sheets 5 may be optimized from the viewpoint of target luminance and light distribution characteristic.

The reflection sheet 6 is made of a material of a mixture of PP (polypropylene) or PET (polyethylene terephthalate) and barium sulfate or titanium oxide. The reflection sheet 6 may be made of resin with microscopic bubbles formed therein, a metal plate with silver deposited thereon, or a metal plate with coating including titanium oxide. The reflection sheet may have a reflectivity of 90 percent or more. A plurality of reflection sheets 6 may be laminated to raise the reflectivity By raising the reflectivity of the reflection sheet 6, luminance at the opening of the top case 7 increases. By applying dot pattern printing to the surface of the reflection sheet facing the light guide plate or to the surface opposite to the light guide plate, it may be possible to improve the uniformity of luminance on the light outgoing surface B of the light guide plate 4. Further, by applying color printing to the reflection sheet 6, it may be possible to offset a color change on the light outgoing surface B caused by absorption of light by the light guide plate 4 or reflection sheet 6. In case printing is applied to the surface opposite to the light guide plate, it may be possible to fine tune the influence on the light outgoing surface B, thus controlling and suppressing uneven luminance between point light sources. In FIG. 1, the reflection sheet 6 is arranged on the surface C of the light guide plate 4. While not shown in FIG. 1, it may be possible to return the light emitted from the side by arranging a reflection sheet on a side other than the light incident surface A (refer to FIGS. 2 to 4), thereby improving the luminance on the light outgoing surface B.

The top case 7 has an opening for transmitting light from the light outgoing surface B of the light guide plate 4 and is designed to leak the minimum light elsewhere to the outside. The top case 7 may be made of a metal such as aluminum, stainless steel or iron, or a resin such as PC (Polycarbonate) or ABS (acrylonitril-butadiene-styrene).

The bottom case 8 has a feature to transmit heat emitted from the point light sources 1 and emit the heat to the surroundings. Thus, the bottom case 8 may be made of a metal that has high strength and heat conductivity. In particular, by using aluminum with high heat conductivity for the bottom case 8, it may be possible to effectively diffuse heat from point light sources to the housing thus lowering the temperature of the point light sources 1. In order to effectively dissipate heat across the bottom case 8 to the air, the bottom case 8 may be arranged on the outermost circumference of a planar light source device.

The resin frame 3 serves also as a reflector to reflect part of light emitted from the point light sources 1 onto the light incident surface A of the light guide plate. Thus, the resin frame 3 may be white from the viewpoint of reflecting efficiency of light. The material of the resin frame 3 may be a resin material as a mixture of PC (polycarbonate) or ABS (acrylonitril-butadiene-styrene) and titanium oxide and the reflectivity is desirably 90 percent or more.

The planar light source device shown in FIG. 1 includes a display part 9 using a liquid crystal at the opening. The display part 9 is arranged on light outgoing surface B of the light guide plate 4 through the optical sheets 5. The display part 9 arranged on top of the planar light source device serves as a display part to which the birefringence of liquid crystal is applied in case the display uses a liquid crystal. In case the display part 9 uses a liquid crystal, the display part 9 includes a counter substrate composed of an insulating substrate of glass on which a coloring layer, a light-shielding layer and a counter electrode are formed, and a TFT array substrate composed of insulating substrate of glass on which a TFT array substrate is arranged where a thin-film transistor (TFT) and a pixel electrode are formed (not shown). The liquid crystal display part includes a spacer for retaining spacing between the counter substrate and the TFT array substrate, a sealant for bonding the counter substrate to the TFT array substrate, a liquid crystal clamped between the counter substrate and the TFT array substrate, a sealant for an inlet to inject a liquid crystal, an alignment film for light distribution of the liquid crystal, and a deflector (not shown). In this embodiment, a general liquid crystal display part is used so that detailed description is omitted.

The display device includes a circuit substrate 10 for driving the display part 9. The circuit substrate 10 includes glass epoxy formed a copper pattern thereon and a plurality of electronic components are mounted by soldering. The circuit substrate 10 is mainly arranged on the rear surface (the side where light is not emitted) of the planar light source device and is mechanically held to the planar light source device by a fixing screw 13, caulking or clamping pawls. To protect the circuit substrate 10 from external pressure or static electricity, a protection cover 11 is mounted. The protection cover 11 may be made of aluminum, stainless steel, or a galvanized sheet. To the surface of the protection cover 11 facing the circuit substrate 10 is applied a resin sheet of PET or the like (not shown) in order to avoid electrical contact with the circuit substrate or an electronic components on the circuit substrate. The protection cover 11 is mechanically held to the rear surface of the planar light source device by a screw or caulking. The protection cover 11 has a hole (through hole) formed in close proximity to a variable resistor on the circuit substrate 10 so as to control the variable resistor after the protection cover 11 is mounted. In case the external pressure is not high, a PET sheet may be used as a substitute for the protection cover 11. In this case, it is not necessary to bond an insulating film between the cover and the circuit substrate 10, which reduces the number of parts used.

Next, an optical path through which light emitted from the point light sources 1 passes to be emitted from the light outgoing surface B of the light guide plate 4 will be described. First, light emitted from the point light sources 1 is incident on the light incident surface A of the light guide plate 4 directly or after being reflected on the reflection sheet 6. The light incident on the light guide plate 4 from the light incident surface A propagates inside the light guide plate while repeating total reflection at the boundary of the light guide plate 4 and an air layer. The light propagating inside the light guide plate 4 is diffused and reflected by way of a dot pattern printing (not shown) applied to the surface C of the light guide plate 4. The propagating direction of the light is changed by the surface C of the light guide plate 4 so that it is possible to emit light having an angle of incidence not satisfying the critical angle with respect to the boundary of the light guide plate 4 and the air layer from the light outgoing surface B of the light guide plate 4. The light emitted from the light outgoing surface B of the light guide plate 4 is incident on the display part 8 from an opening through the optical sheets 5. Part of the light is emitted from sides other than the light outgoing surface B of the light guide plate 4 and is reflected on the reflection sheet 6 arranged on the sides other than the surface C and the light incident surface A of the light guide plate 4. Thus, the light re-enters the light guide plate 4 and is not emitted elsewhere than the light outgoing surface B of the light guide plate 4.

The configuration of a resin frame 3, the optical path in close proximity to a point light source 1 and the optical path in close proximity to an adjacent point light source 1 in the planar light source device according to this embodiment will be described. FIGS. 2 to 4 are cross-sectional views of a display device along the X-X direction assembled and completed from parts shown the exploded view of FIG. 1. FIG. 2 is a cross-sectional view of a point light source. FIG. 3 is a cross-sectional view of the area between adjacent point light sources. FIG. 4 is a cross sectional view of the proximity to both ends of a light source substrate. As understood from the cross sectional-view of the point light source 1 (FIG. 2), the resin frame 3 includes a gap formed at the portion facing the point light source 1 (refer to FIG. 5) in order to avoid interference with the point light source 1. A side of the resin frame that comes in contact with the bottom case includes no gaps between adjacent point light sources and has a continuous shape. In the resin frame having such a configuration, light from the point light sources 1 is reflected on the light incident surface A of the light guide plate 4. An end of the light outgoing surface B of the light guide plate 4 is supported by a projection 12 of the resin frame.

The cross-sectional configuration of the area between adjacent point light sources 1 shown in FIG. 3 will be described. In FIG. 3 also, an end of the light outgoing surface B of the light guide plate 4 is supported by a projection 12 of the resin frame 3. This supports (fixes) the position of the light guide plate 4 on the side of the light outgoing surface B and prevents light from the point light source 1 from entering the light outgoing surface B of the light guide plate 4. The resin frame 3 includes a side surface and a projection 14 that sandwich a light source substrate 2 and the side of the bottom case 8 formed almost in parallel to the light incident surface A of the light guide plate 4. The light source substrate 2 and the side of the bottom case 8 are bonded together with an adhesive. The resin frame 3 includes a clearance (gap). The thickness of the gap is equivalent to or slightly smaller than the total thickness of the light source substrate 2 and the side of the bottom case 8. This slightly enlarges the gap of the resin frame 3 from an original dimension when the resin frame 3 is inserted into the light source substrate 2 and the bottom case 8. With this configuration, the force to sandwich the light source 2 and the bottom case 8 increases with the elastic force of the resin frame 3, thus increasing the heat conductivity between the light source substrate 2 and the bottom case 8 and reducing the influence of the heat from the point light source.

Next, the cross-sectional view of both ends of the light source substrate 2 (FIG. 4) will be described. Same as FIG. 3, the resin frame 3 has a configuration to sandwich the light source substrate 2 and the side of the bottom case 8 from both sides. The thickness of the projection 14 of the resin frame 3 is different from that in FIG. 3. The projection 14 extends to the light incident surface A of the light guide plate 4 and supports (fixes) the light incident surface A of the light guide plate 4 in close proximity to the light source substrate 2 or the end of the resin frame 3 so as to keep constant the distance between the light incident surface A of the light guide plate 4 and the point light source 1. This prevents damage to the point light source 1 with the movement of the light guide plate 4 even when the light guide plate 4 is vibrated or impacted, thus providing a reliable planar light source device.

As shown in FIGS. 2 to 4, the reflection sheet 6 extends to the point light source 1 on the surface C of the light guide plate 4. Thus, the surface C is not exposed and light from the point light source 1 does not enter the surface C.

FIG. 5 shows an enlarged perspective view of a corner of the planar light source device according to Embodiment 1. As shown in FIG. 5, a side wall surface E is formed at the end of the resin frame 3. The side wall surface E is also arranged at the opposed end (opposite end of the resin frame) and is integrated with the resin frame 3. The light guide plate 4 is inserted into the wide wall surfaces E at both ends of the resin frame 3. A side surface D perpendicular to the light incident surface A of the light guide plate 4 comes into contact with the side wall surface E of the resin frame 3 to support (fix) the light guide plate 4 at a predetermined position.

In an planar light source device using a point light source such as an LED, the fact that the proximity to a point light source is bright while the portion between adjacent point light sources is dark has been solved by a method for providing a pale dot pattern near a point light source and a dense dot pattern between adjacent point light sources. In the related art, it is necessary to reduce the dislocation in the relative position of the point light source and the dot printing on the light guide plate in the direction of point light source arrangement. That is, dislocation between a point light source and dot printing degrades the display quality. By using the resin frame according to this embodiment, it may be possible to suppress dislocation between a point light source and dot printing on the light guide plate thus preventing degradation of display quality. This embodiment may be applied to a large-sized planar light source device (for example with a 7-inch width across corner or above) that is likely to cause unevenness in luminance by the dislocation between a light guide plate and a point light source.

Embodiment 2

Figure 6:
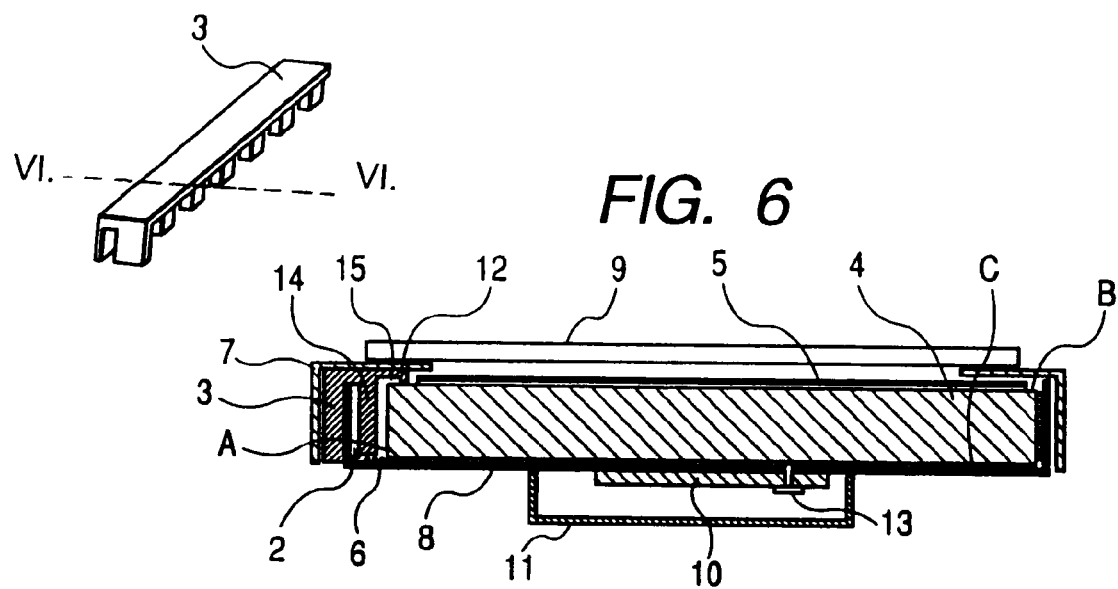
FIG. 6 is a cross-sectional view of the area between adjacent point light sources shown in FIG. 1 along the VI-VI direction according to Embodiment 2.

Embodiment 2 of the invention will be described referring to FIG. 6. FIG. 6 is cross-sectional view of a display device along the VI-VI direction assembled and completed from parts shown in the exploded view of FIG. 1 according to Embodiment 1. In FIG. 6, same components as those in FIGS. 1 to 5 are given the same reference numbers.

FIG. 6 shows a planar light source device according to Embodiment 2. Differences from Embodiment 1 will be described. FIG. 6 is a cross-sectional view of the area between adjacent point light sources of the planar light source device according to Embodiment 2. The cross sectional configuration of a point light source and the proximity to both ends of a resin frame of the planar light source device shown in FIG. 6 is the same as that in Embodiment 1. In FIG. 6, Embodiment 2 is different from Embodiment 1 in that a projection 12 of the resin frame 3 coming into contact with the light outgoing surface B of the light guide plate 4 between point light sources 1 is configured so that an exposed part 15 (void part) is formed between the light outgoing surface B and the projection 12 of the resin frame. The light outgoing surface B is partially exposed although covered by the projection 12 of the resin frame 3. With this configuration, part of the light from the point light sources 1 enters the exposed part 15 (void part) of the light outgoing surface B. In this embodiment, the exposed part 15 serves as light incidence part that makes light directly incident on the light outgoing surface B. The light incident on the light outgoing surface B of the light guide plate 4 is emitted from the surface C of the light guide plate 4 and is reflected on the reflection sheet 6 and is incident on the light guide plate 4 again. After that, part of the light incident on the light guide plate 4 again is directly emitted from the light outgoing surface B.

As mentioned above, in this embodiment, the light incidence part that makes light incident on the light outgoing surface of a light guide plate is formed in an area between adjacent point light sources that are discretely arranged. This configuration generates quasi-high-luminance parts. This suppresses uneven luminance caused by higher luminance near a point light source and provides continuous high luminance in close proximity to the light incident surface of a light guide plate thus enhancing the uniformity of luminance distribution.

Assuming the distance L from the light incident surface A of the light guide plate 4 to the tip of the projection 12 of the resin frame 3, by gradually changing the distance L so that the distance L reaches a maximum value at the center of each area between adjacent point light sources 1, it may be possible to further enhance the uniformity of luminance distribution. Or, the configuration of the projection 12 may be changed so that the distance L reaches a maximum value at a position at one third or two thirds of the area between adjacent point light sources 1. In this case, two quasi-high-luminance parts appear in each area between adjacent point light sources thus further enhancing the uniformity of luminance distribution.

Embodiment 3

Figure 7:
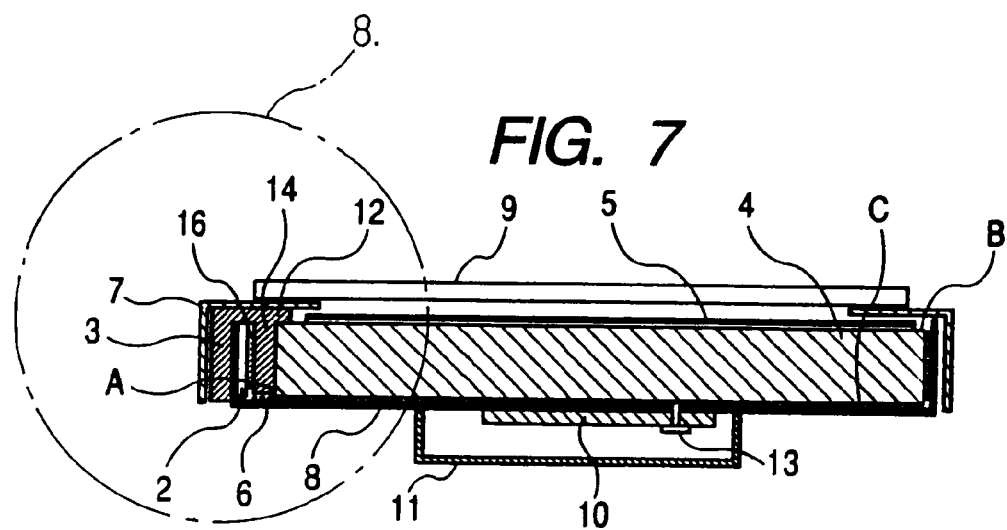
FIG. 7 is a cross-sectional view of area between adjacent point light sources shown in FIG. 1 along the VI-VI direction according to Embodiment 3.
Figure 8:
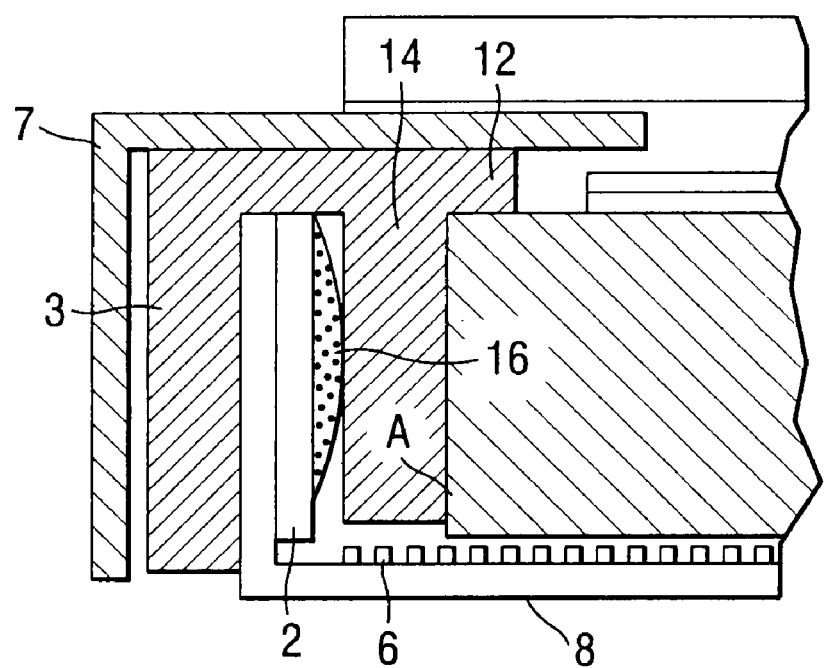
FIG. 8 is an enlarged view of the indicated region of FIG. 7.

Embodiment 3 of the invention will be described referring to FIGS. 7 and 8. FIG. 7 shows cross-sectional view of a display device along the VI-VI direction assembled and completed from parts shown in the exploded view of FIG. 1 according to Embodiment 1. FIG. 8 shows an enlarged view of the leftmost side of FIG. 7. In FIGS. 7 and 8, same components as those in FIGS. 1 to 6 are given the same reference numbers.

FIG. 7 illustrates a planar light source device according to Embodiment 3. Differences from Embodiments 1 and 2 will be described. FIG. 7 is a cross-sectional view of the portion between adjacent point light sources of the planar light source device according to Embodiment 3. The cross sectional configuration of a point light source and the proximity to both ends of a resin frame of the planar light source device shown in FIGS. 7 and 8 is the same as that in Embodiment 1. In FIGS. 7 and 8, Embodiment 3 is different from Embodiments 1 and 2 in that a dome-shaped part 16 made of solder is provided on a light source substrate 2 at each area between adjacent point light sources 1. The resin frame 3 includes a side and a projection 14 that sandwiches the light source substrate 2 and the side of the bottom case 8. The elastic force of the resin frame 3 concentrates on the dome-shaped part 16 formed on the light source substrate 2.

With this configuration, it may be possible to firmly sandwich the center portion of the substrate in particular (point light sources are arranged almost on the center portion of the light source substrate) that is the most important portion in terms of heat dissipation among the region including the light source substrate 2 and the side of the bottom case 8. This reduces the heat resistance between the light source substrate 2 and the side of the bottom case 8 thus reducing the influence of heat from point light sources. The dome-shaped solder reduces the resistance exerted when the resin frame 3 is mounted thus facilitating the assembling process. Further, the dome-shaped solder may be formed at the same time as the solder application process in the procedure for mounting point light sources. This requires no additional processes. The height of a dome-shaped solder may be changed depending on the size of a copper foil on a light source substrate or viscosity of the solder to be applied. This provides a planar light source device excellent in reliability and light emission quantity of a point light source. While a dome shape formed by solder is provided between point light sources on a light source substrate in this embodiment, a projection alone may deliver the same heat dissipation effect described above. Still, the dome shape formed by solder may be preferable from the viewpoint of work efficiency and costs of assembly. The combination of the shape, position and quantity of a solder dome that assures high heat conductivity may be optimized.

While the invention has been described in terms of Embodiments 1 to 3, individual combinations of various shapes in these embodiments deliver respective effects. The point light source used in the invention is not limited to an LED. A light source that mixes red, green and blue light beams to generate white light is applicable to the embodiments. It may be possible to suppress the unevenness in luminance and color so as to make uniform the luminance of each color on the light outgoing surface of a light guide plate thus obtaining uniform white light.

While a liquid crystal display device including a liquid crystal display part on a planar light source device in Embodiments 1 to 3, the invention is not limited thereto but a display part for displaying an image by using light from a planar light source device instead of a liquid crystal display part, such as a signboard and a guide lamp, is included in the invention. While the shape of a light guide plate is planar in Embodiments 1 to 3, the invention is not limited thereto. Providing a wedge-shaped light guide plate whose thickness decreases as the distance from a point light source increases allows incident light to be efficiently propagated and efficiently guided to the light outgoing surface B. By providing a wedge-shaped light guide plate, it may be possible to reduce the quantity of light reflected on a reflection sheet on the surface C of the light guide plate. This reduces the reflection loss on a reflection sheet while increasing the quantity of light emitted from the light outgoing surface B.

What is claimed is:

1. A planar light source device comprising:
   a plurality of point light sources, each of which emits a light;
   a light guide plate including a first surface, and a second surface perpendicular to the first surface, the light guide plate being configured to guide the emitted lights incident from the first surface to be emitted from the second surface;
   a bottom case including a side portion substantially parallel to the first surface;
   a light source substrate including the plurality of point light sources arranged thereon at a predetermined interval, the light source substrate being arranged at a side of the first surface; and
   a frame that clamps, from opposite directions, the light source substrate and the side portion of the bottom case, and includes
      a projection extending over and contacting the second surface, and
      a plurality of gaps at positions facing the point light sources.

2. The planar light source device according to claim 1,
   wherein the frame includes a projection extending over and contacting the second surface, and
   the projection includes a void in at least one region between adjacent point light sources,
   the second surface includes a region facing and in direct contact with said projection, and
   wherein the emitted light from the point light sources is reflected and scattered by the void in said projection and enters the exposed region of the second surface.

3. The planar light source device according to claim 1,
   wherein the light guide plate includes two side surfaces perpendicular to the second surface and perpendicular to the first surface, and
   wherein the frame clamps the two side surfaces of the light guide plate from opposite sides along the direction substantially normal to the side surfaces.

4. The planar light source device according to claim 1,
   wherein the frame is white.

5. The planar light source device according to claim 1,
   wherein the light source substrate includes a dome-shaped/convex portion between adjacent point light sources.

6. The planar light source device according to claim 5,
   wherein the convex portion includes a dome-shaped solder.

7. The planar light source device according to claim 1, wherein the point light sources include light-emitting diodes.

8. The planar light source device according to claim 1, wherein the frame presses against the first surface of the light guide plate.

9. The planar light source device according to claim 8, wherein the light guide plate includes two side surfaces perpendicular to the second surface and perpendicular to the first surface, and
wherein the frame clamps the two side surfaces of the light guide plate from opposite sides along the direction substantially normal to the side surfaces.

10. The planar light source device according to claim 1, wherein the frame includes at least one volume of frame material interposed between the light source substrate and the first surface.

11. The planar light source device according to claim 1, wherein the plurality of gaps correspond to the plurality of point light sources.

12. The planar light source device according to claim 1, wherein each of the plurality of gaps corresponds to respective one of the plurality of point light sources.

* * * * *